United States Patent
Hasegawa et al.

(10) Patent No.: US 12,509,156 B2
(45) Date of Patent: Dec. 30, 2025

(54) SIDE SILL STRUCTURE FOR VEHICLE

(71) Applicant: Honda Motor Co., Ltd., Tokyo (JP)

(72) Inventors: Atsushi Hasegawa, Saitama (JP); Hitomi Yamada, Saitama (JP); Yumi Saito, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 18/176,484

(22) Filed: Mar. 1, 2023

(65) Prior Publication Data

US 2023/0312005 A1    Oct. 5, 2023

(30) Foreign Application Priority Data

Mar. 31, 2022 (JP) .................... 2022-060076

(51) Int. Cl.
*B62D 25/02* (2006.01)
*B62D 21/15* (2006.01)
*B62D 25/20* (2006.01)

(52) U.S. Cl.
CPC ......... *B62D 25/025* (2013.01); *B62D 21/157* (2013.01); *B62D 25/2036* (2013.01)

(58) Field of Classification Search
CPC ............. B62D 25/025; B62D 25/2036; B62D 21/157; B62D 21/20
USPC ............................. 296/209, 29, 30, 187.12
See application file for complete search history.

(56) References Cited

U.S. PATENT DOCUMENTS

| 10,155,542 | B2 * | 12/2018 | Gao ...................... B62D 21/157 |
| 11,077,812 | B2 * | 8/2021 | Rodgers ..................... F16F 7/12 |
| 11,745,802 | B2 * | 9/2023 | Song ...................... B60J 5/0437 |
| | | | 296/203.01 |
| 11,987,293 | B2 * | 5/2024 | Tsubaki ............... B62D 25/025 |
| 12,043,314 | B2 * | 7/2024 | Bodin .................. B62D 21/157 |
| 12,060,110 | B2 * | 8/2024 | Tsubaki .................. B60K 1/04 |
| 2011/0095568 | A1 | 4/2011 | Terada et al. |
| 2023/0347985 | A1 | 11/2023 | Schelén et al. |

FOREIGN PATENT DOCUMENTS

| CN | 102050151 | 5/2011 |
| JP | 2006205797 | 8/2006 |
| JP | 2007196748 | 8/2007 |
| JP | 2021024350 | 2/2021 |
| JP | 2021054117 | 4/2021 |
| JP | 2021091341 | 6/2021 |
| JP | 2023517826 | 4/2023 |
| WO | 2021071410 | 4/2021 |
| WO | 2021180403 | 9/2021 |

OTHER PUBLICATIONS

"First Office Action of China Counterpart Application", issued on Sep. 29, 2025, with English translation thereof, pp. 1-13.
"Notice of Reasons for Refusal of Japan Counterpart Application", issued on Sep. 30, 2025, with English translation thereof, pp. 1-6.

* cited by examiner

*Primary Examiner* — Dennis H Pedder
(74) *Attorney, Agent, or Firm* — JCIPRNET (57) ABSTRACT

A side sill structure for a vehicle is provided. A side sill includes an inner panel, an outer panel, and a reinforcing member. The reinforcing member is arranged in a closed cross section formed by joining the inner panel and the outer panel. The reinforcing member includes a first reinforcing member arranged on an upper side in the side sill and a second reinforcing member arranged below the first reinforcing member.

6 Claims, 5 Drawing Sheets

SIDE SILL STRUCTURE FOR VEHICLE

CROSS-REFERENCE TO RELATED APPLICATION

This application claims the priority benefit of Japan application serial no. 2022-060076, filed on Mar. 31, 2022. The entirety of the above-mentioned patent application is hereby incorporated by reference herein and made a part of this specification.

BACKGROUND

Technical Field

The disclosure relates to a side sill structure for a vehicle.

Related Art

Conventionally, a vehicle is provided with a side sill that is arranged at two ends in the vehicle width direction of a floor part of a vehicle body and extends in the front-rear direction of the vehicle body. For example, the technique disclosed in Patent Document 1 (Japanese Patent Application Laid-Open No. 2021-91341) is known as such a side sill structure.

The side sill structure (hereinafter referred to as "conventional art" in this specification) disclosed in Patent Document 1 includes an inner panel forming a vehicle width direction inner side, an outer panel forming a vehicle width direction outer side, a plurality of bulkheads arranged at a predetermined interval along the front-rear direction of the vehicle body in a closed cross section formed by joining the inner panel and the outer panel, and a load absorbing member arranged between the bulkheads in the closed cross section.

The load absorbing member has a wavy cross-sectional part in a wavy shape (W-shape) when viewed in the vehicle width direction (see FIG. 4 of Patent Document 1). Such conventional art provides a structure capable of improving the load absorbing performance at the time of an input of a side collision load.

At the time of a side collision, the load inputted to the side sill includes (1) a load that deforms the side sill from the vehicle width direction outer side toward the vehicle width direction inner side, and (2) a load that generates a moment (torsion) causing the side sill to collapse toward the vehicle interior side.

The load of (1) is a load that deforms the cross-sectional shape of the side sill, and the load of (2) is a load that causes peeling of the side sill. If the cross-sectional shape of the side sill is deformed or the side sill is peeled off, it may become difficult to efficiently absorb the side collision load and transmit the load to the vehicle body side.

The structure of the conventional art is specialized for the absorption performance for the load of (1), and cannot improve the absorption performance for the load of both (1) and (2).

SUMMARY

Invention 1 of the disclosure provides a side sill structure for a vehicle. A side sill arranged at two ends in a vehicle width direction of a floor part of a vehicle and extending in a front-rear direction of the vehicle includes an inner panel, an outer panel, and a reinforcing member. The inner panel forms a vehicle width direction inner side. The outer panel forms a vehicle width direction outer side. The reinforcing member is arranged in a closed cross section formed by joining the inner panel and the outer panel. The reinforcing member includes a first reinforcing member and a second reinforcing member. The first reinforcing member is arranged on an upper side in the side sill and has a wavy shape when viewed from the vehicle width direction. The second reinforcing member is arranged below the first reinforcing member.

According to Invention 1 of the disclosure, since the first reinforcing member in a wavy shape when viewed from the vehicle width direction is arranged on the upper side in the closed cross section of the side sill, and the second reinforcing member is arranged below the first reinforcing member in the closed cross section of the side sill, when the side sill is twisted due to an input of a side collision load, the first reinforcing member and the second reinforcing member abut against each other, and load transmission between the bulkhead and the side sill becomes possible. As a result, it is possible to suppress peeling of the side sill and deformation of the cross-sectional shape of the side sill at the time of an input of a side collision load, and the efficiency of load transmission to the vehicle body side can be improved.

DESCRIPTION OF THE EMBODIMENTS

An embodiment of the disclosure provides a side sill structure capable of improving the efficiency of load transmission to a vehicle body side by suppressing peeling of a side sill and deformation of a cross-sectional shape of the side sill at the time of an input of a side collision load, to suppress a decrease in traffic smoothness of vehicles while improving the safety of traffic.

Invention 1 of the disclosure provides a side sill structure for a vehicle. A side sill arranged at two ends in a vehicle width direction of a floor part of a vehicle and extending in a front-rear direction of the vehicle includes an inner panel, an outer panel, and a reinforcing member. The inner panel forms a vehicle width direction inner side. The outer panel forms a vehicle width direction outer side. The reinforcing member is arranged in a closed cross section formed by joining the inner panel and the outer panel. The reinforcing member includes a first reinforcing member and a second reinforcing member. The first reinforcing member is arranged on an upper side in the side sill and has a wavy shape when viewed from the vehicle width direction. The second reinforcing member is arranged below the first reinforcing member.

In Invention 2 of the disclosure, the side sill includes a joining flange formed by joining the inner panel and the outer panel. The first reinforcing member is joined to an upper wall of the outer panel and extends toward the vehicle width direction inner side across the joining flange.

In Invention 3 of the disclosure, the second reinforcing member is joined to the inner panel.

In Invention 4 of the disclosure, the first reinforcing member and the second reinforcing member are arranged side by side with a cross member in the vehicle width direction, the cross member being provided in the floor part.

In Invention 5 of the disclosure, the second reinforcing member is formed in a box shape forming a closed cross section with the inner panel.

In Invention 6 of the disclosure, the second reinforcing member includes an extending part clamped and joined by the joining flange.

In Invention 7 of the disclosure, the second reinforcing member is joined to an inner wall of the inner panel and is formed into a U-shaped cross section opened toward the vehicle width direction inner side when viewed from an axial direction of the side sill.

In Invention 8 of the disclosure, the second reinforcing member extends more outward in the vehicle width direction than the joining flange.

According to Invention 1 of the disclosure, since the first reinforcing member in a wavy shape when viewed from the vehicle width direction is arranged on the upper side in the closed cross section of the side sill, and the second reinforcing member is arranged below the first reinforcing member in the closed cross section of the side sill, when the side sill is twisted due to an input of a side collision load, the first reinforcing member and the second reinforcing member abut against each other, and load transmission between the bulkhead and the side sill becomes possible. As a result, it is possible to suppress peeling of the side sill and deformation of the cross-sectional shape of the side sill at the time of an input of a side collision load, and the efficiency of load transmission to the vehicle body side can be improved.

According to Invention 2 of the disclosure, since the second reinforcing member is arranged below the first reinforcing member joined to the outer panel, when the side sill is twisted due to a side collision, the first reinforcing member and the second reinforcing member abut against each other, and a moment (torsion) load inputted to the outer panel can be transmitted to the vehicle body side via the first reinforcing member and the second reinforcing member. As a result, it is possible to suppress peeling of the side sill and deformation of the cross-sectional shape of the side sill at the time of an input of a side collision load, and the efficiency of load transmission to the vehicle body side can be improved.

According to Invention 3 of the disclosure, since the second reinforcing member joined to the inner panel is arranged below the first reinforcing member joined to the outer panel, when the side sill is twisted due to a side collision, the first reinforcing member and the second reinforcing member abut against each other, and a moment (torsion) load inputted to the inner panel and the outer panel can be transmitted via the first reinforcing member and the second reinforcing member to each other and to the vehicle body side. As a result, it is possible to suppress peeling of the side sill and deformation of the cross-sectional shape of the side sill at the time of an input of a side collision load, and the efficiency of load transmission to the vehicle body side can be improved.

According to Invention 4 of the disclosure, since the reinforcing member is arranged side by side with the cross member in the vehicle width direction, even if the side sill rotates due to a side collision, a load can be transmitted to the cross member, which has a high rigidity, via the first reinforcing member and the second reinforcing member. As a result, it is possible to suppress peeling of the side sill and deformation of the cross-sectional shape of the side sill at the time of an input of a side collision load, and the efficiency of load transmission to the vehicle body side can be improved.

According to Invention 5 of the disclosure, since the second reinforcing member is formed in a box shape forming a closed cross section with the inner panel, the efficiency of load transmission between the first reinforcing member and the second reinforcing member is improved when the first reinforcing member and the second reinforcing member abut against each other, and the rigidity of the side sill can be improved. As a result, it is possible to suppress peeling of the side sill and deformation of the cross-sectional shape of the side sill at the time of an input of a side collision load, and the efficiency of load transmission to the vehicle body side can be improved.

According to Invention 6 of the disclosure, since the second reinforcing member includes the extending part which is clamped and joined by the joining flange, the joining strength between the second reinforcing member and the side sill and the joining strength between the inner panel and the outer panel are improved, and it is possible to suppress peeling of the joining parts of the joining flange and peeling between the second reinforcing member and the side sill when the side sill rotates. As a result, it is possible to suppress peeling of the side sill and deformation of the cross-sectional shape of the side sill at the time of an input of a side collision load, and the efficiency of load transmission to the vehicle body side can be improved.

According to Invention 7 of the disclosure, since the second reinforcing member is joined to the inner wall of the inner panel and is formed in a U-shaped cross section opened toward the vehicle width direction inner side when viewed from the axial direction of the side sill, the efficiency of load transmission between the first reinforcing member and the second reinforcing member is improved when the first reinforcing member and the second reinforcing member abut against other, and the rigidity of the side sill can be improved. Further, since the lower part of the inner panel is pressed against the vehicle interior side when a side collision load is inputted to the second reinforcing member, it is possible to oppose to a force of the upper part of the side sill collapsing toward the vehicle interior side. As a result, it is possible to suppress peeling of the side sill and deformation of the cross-sectional shape of the side sill at the time of an input of a side collision load, and the efficiency of load transmission to the vehicle body side can be improved.

According to Invention 8 of the disclosure, since the second reinforcing member extends more outward in the vehicle width direction than the joining flange, the efficiency of load transmission between the first reinforcing member and the second reinforcing member is improved when the first reinforcing member and the second reinforcing member abut against each other, and the rigidity of the side sill can be improved. Further, since the lower part of the inner panel is pressed against the vehicle interior side when a side collision load is inputted to the second reinforcing member, it is possible to oppose to a force of the upper part of the side sill collapsing toward the vehicle interior side. As a result, it is possible to suppress peeling of the side sill and deformation of the cross-sectional shape of the side sill at the time of an input of a side collision load, and the efficiency of load transmission to the vehicle body side can be improved.

Hereinafter, a first embodiment of a side sill structure according to the disclosure will be described with reference to FIG. 1 to FIG. 3, and a second embodiment of the side sill structure according to the disclosure will be described with reference to FIG. 1, FIG. 4, and FIG. 5.

First Embodiment

Hereinafter, the first embodiment of the disclosure will be described with reference to FIG. 1 to FIG. 3. FIG. 1 is a view showing a side sill structure according to the disclosure, (a) of FIG. 1 is a side view showing a state viewed from a lateral side of a lower edge side of a vehicle body of a vehicle, and (b) of FIG. 1 is a perspective view showing a state of a side sill, a floor part, etc. shown in (a) of FIG. 1, as viewed obliquely from above. FIG. 2 is a partially see-through view showing a part (where a reinforcing member is arranged) of the side sill structure according to the first embodiment of the disclosure, and is a perspective view showing a state viewed from a rear side. FIG. 3 is a cross-sectional view taken along line A-A in FIG. 2.

The arrows in the drawings respectively indicate the up-down direction, the left-right direction, and the front-rear direction (the directions of the arrows are exemplary).

Figure 1:
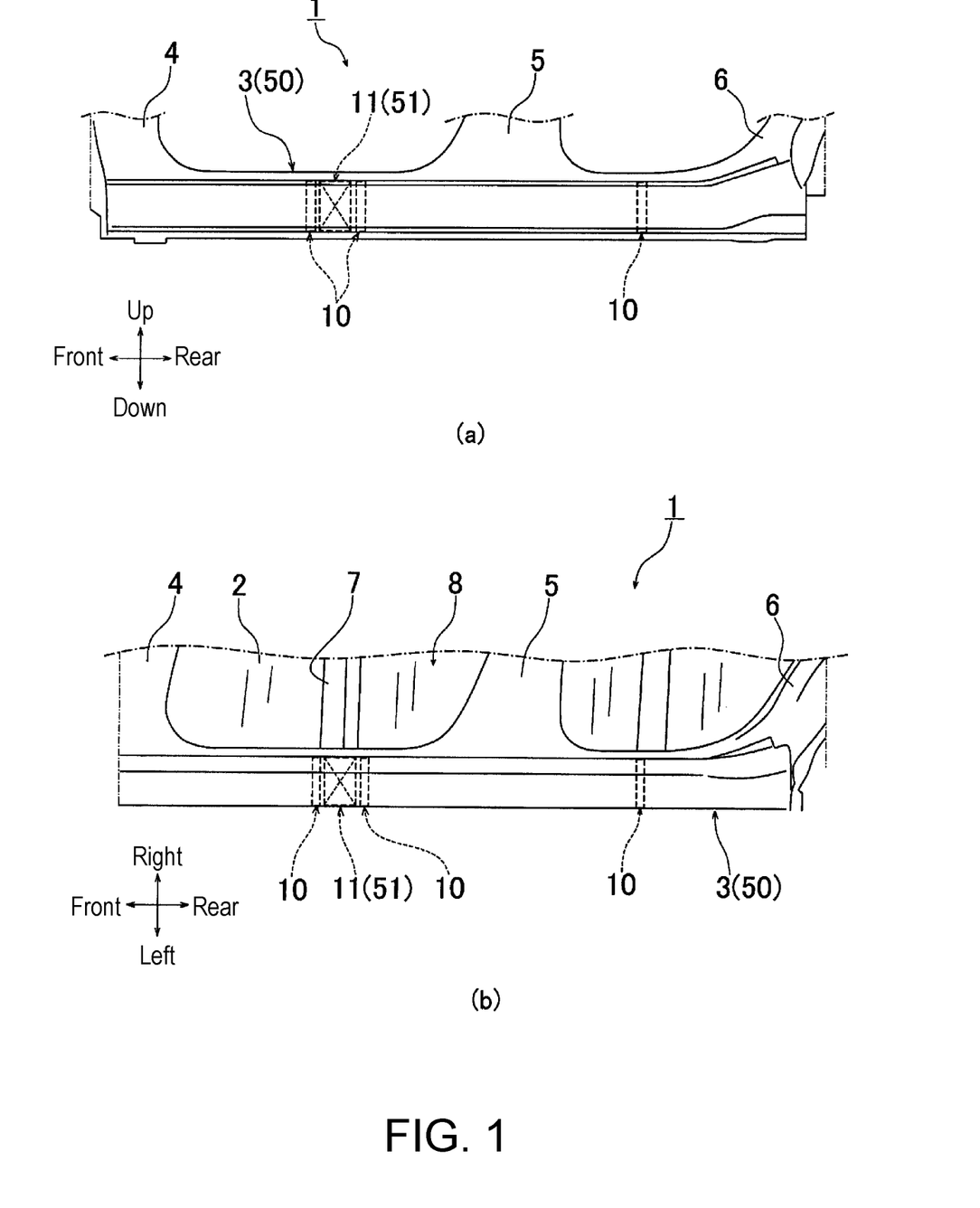
FIG. 1 is a view showing a side sill structure according to the disclosure, (a) of FIG. 1 is a side view showing a state viewed from a lateral side of a lower edge side of a vehicle body of a vehicle, and (b) of FIG. 1 is a perspective view showing a state of a side sill, a floor part, etc. shown in (a) of FIG. 1, as viewed obliquely from above.

This embodiment describes a case where the side sill structure according to the disclosure is applied to a side sill 3 that is arranged at two ends in the vehicle width direction (left-right direction in FIG. 1) of a floor part 2 of a vehicle body 1 of a vehicle shown in FIG. 1 and extends in the front-rear direction of the vehicle body 1.

In FIG. 1, reference sign 4 indicates a "front pillar", reference sign 5 indicates a "center pillar", reference sign 6 indicates a "rear pillar", reference sign 7 indicates a "cross member", and reference sign 8 indicates "vehicle interior".

The front pillar 4, the center pillar 5, and the rear pillar 6 are respectively arranged to extend upward to intersect the side sill 3 with a front side, a substantially middle part, and a rear side of the vehicle body 1 being taken as base ends. The cross member 7 is arranged to extend in the vehicle width direction of the floor part 2 and connect the pair of side sills 3.

Figure 2:
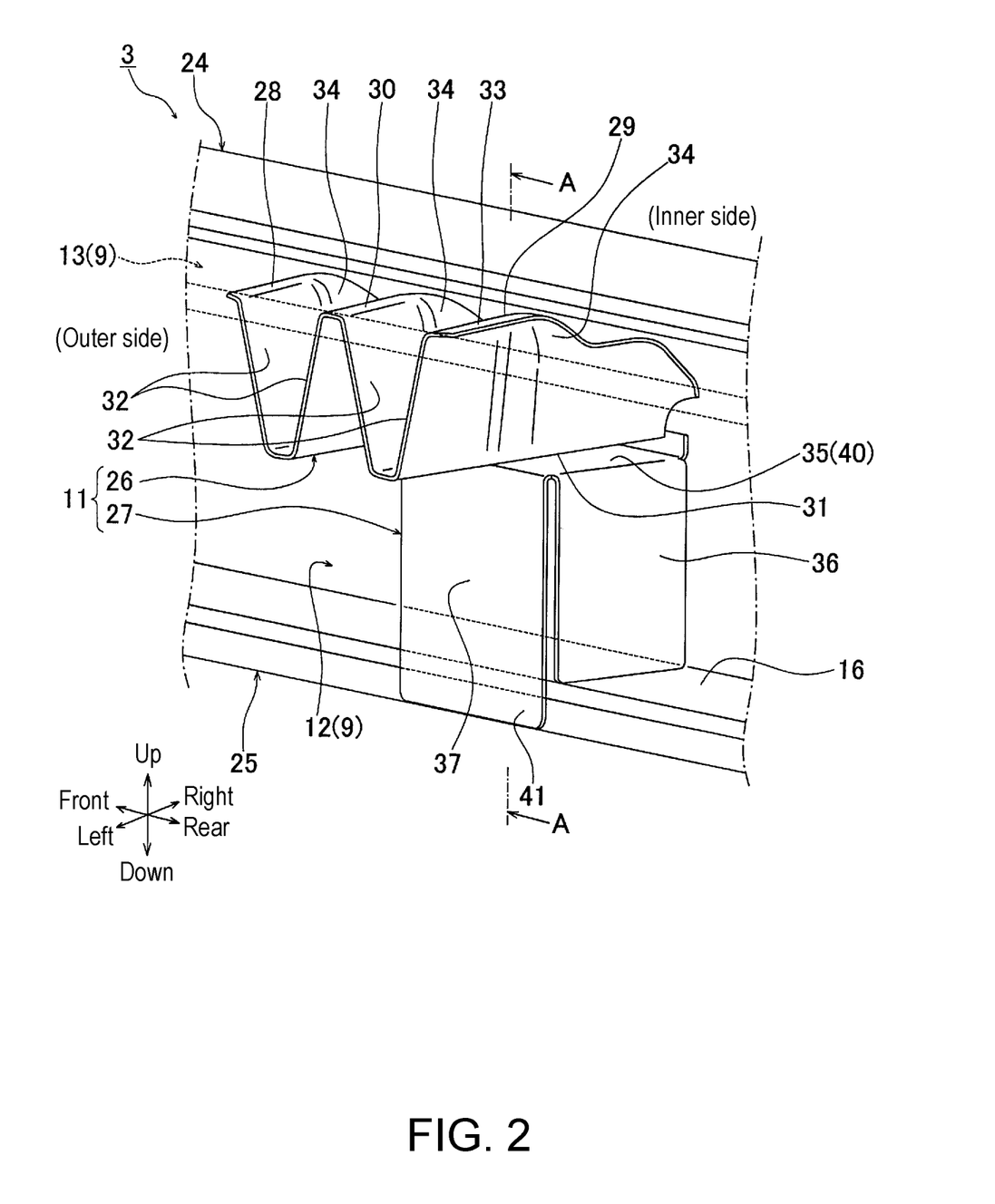
FIG. 2 is a partially see-through view showing a part (where a reinforcing member is arranged) of the side sill structure according to a first embodiment of the disclosure, and is a perspective view showing a state viewed from a rear side.

As shown in FIG. 2, the side sill 3 includes a hollow frame body 9 extending in the front-rear direction of the vehicle body 1, a plurality of bulkheads 10 arranged inside the frame body 9, and a reinforcing member 11 arranged between the bulkheads 10.

Figure 3:
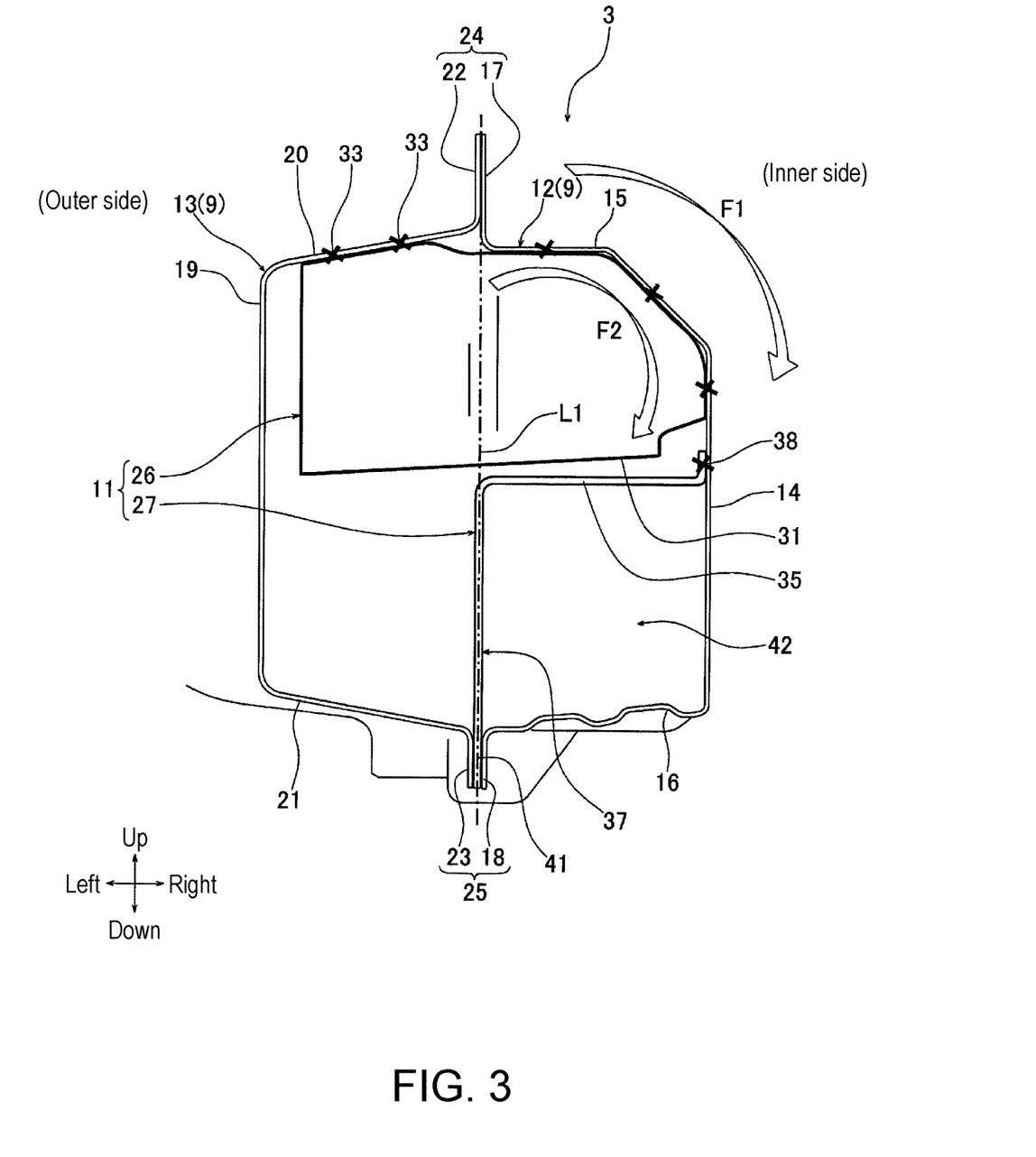
FIG. 3 is a cross-sectional view taken along line A-A in FIG. 2.

As shown in FIG. 2 and FIG. 3, the frame body 9 is configured by joining an inner panel 12 forming a vehicle width direction inner side and an outer panel 13 forming a vehicle width direction outer side. Each configuration of the side sill 3 according to this embodiment will be described below.

First, the inner panel 12 will be described. As shown in FIG. 3, the inner panel 12 includes an inner wall 14, an upper wall 15, a lower wall 16, and joining parts 17 and 18.

The upper wall 15 is formed to have one end continuous with an upper end part of the inner wall 14 and extend toward the vehicle width direction outer side. The lower wall 16 is formed to have one end continuous with a lower end part of the inner wall 14 and extend toward the vehicle width direction outer side.

The joining part 17 is formed to be continuous with another end of the upper wall 15 and extend upward perpendicularly to an axial direction of the side sill 3. The joining part 18 is formed to be continuous with another end of the lower wall 16 and extend downward perpendicularly to the axial direction of the side sill 3.

Next, the outer panel 13 will be described. As shown in FIG. 3, the outer panel 13 includes an outer wall 19, an upper wall 20, a lower wall 21, and joining parts 22 and 23.

The upper wall 20 is formed to have one end continuous with an upper end part of the outer wall 19 and extend toward the vehicle width direction inner side. The lower wall 21 is formed to have one end continuous with a lower end part of the outer wall 19 and extend toward the vehicle width direction inner side.

The joining part 22 is formed to be continuous with another end of the upper wall 20 and extend upward perpendicularly to the axial direction of the side sill 3. The joining part 23 is formed to be continuous with another end of the lower wall 21 and extend downward perpendicularly to the axial direction of the side sill 3.

As shown in FIG. 3, the frame body 9 includes joining flanges 24 and 25 formed by joining the inner panel 12 and the outer panel 13. The joining flange 24 is formed on an upper side of the frame body 9, and the joining flange 25 is formed on a lower side of the frame body 9.

The joining flange 24 is formed by joining the joining part 17 of the inner panel 12 and the joining part 22 of the outer panel 13. The joining flange 25 is formed by joining the joining part 18 of the inner panel 12 and the joining part 23 of the outer panel 13.

As shown in FIG. 3, the joining flanges 24 and 25 are arranged at substantially the same position in the vehicle width direction and are arranged to oppose to each other in the up-down direction.

Next, the bulkhead 10 will be described. The bulkhead 10 is a member that reinforces the frame body 9, and, although detailed illustration is omitted, is formed in a plate shape and arranged inside the frame body 9, that is, in a closed cross section formed by joining the inner panel 12 and the outer panel 13. The bulkhead 10 is joined to predetermined portions of the inner panel 12 and the outer panel 13.

The side sill 3 in this embodiment includes a plurality of bulkheads 10, which are arranged at a predetermined interval along the longitudinal direction of the frame body 9. In this embodiment, two bulkheads 10 are arranged at two ends of the cross member 7 in the floor part 2 (see (b) of FIG. 1). In this embodiment, the bulkhead 10 is also arranged between the center pillar and the rear pillar 6.

Next, the reinforcing member 11 will be described. The reinforcing member 11 shown in FIG. 2 and FIG. 3 is a member that reinforces the frame body 9 and is a member that enables load transmission between the bulkhead 10 and the side sill 3 when the side sill is twisted due to an input of a side collision load. The reinforcing member 11 is arranged inside the frame body 9, that is, in the closed cross section formed by joining the inner panel 12 and the outer panel 13.

As shown in FIG. 2 and FIG. 3, the reinforcing member 11 is composed of two members, including a first reinforcing member 26 and a second reinforcing member 27. The first reinforcing member 26 and the second reinforcing member 27 are arranged side by side at a predetermined interval in the up-down direction. The first reinforcing member and the second reinforcing member are arranged side by side with the cross member 7 in the vehicle width direction (see (b) of FIG. 1).

As shown in FIG. 2, the first reinforcing member 26 is a member formed by bending a metal plate into a predetermined shape, and is formed in a wavy shape (substantially W-shape) when viewed from the vehicle width direction (left-right direction).

The first reinforcing member 26 includes brim parts 28 and 29, an upper surface 30, a lower surface 31, and an inclined surface 32. The brim parts 28 and 29 are provided at a front upper end part and a rear upper end part in the front-rear direction and extend in the left-right direction. The upper surface 30 is provided at a middle upper end part in the front-rear direction. The lower surface 31 is provided at a lower end part between the brim parts 28 and 29 and the upper surface 30. The inclined surface 32 connects between the brim part 28 and the lower surface 31, between the upper surface 30 and the lower surface 31, and between the brim part 29 and the lower surface 31.

The brim parts 28 and 29 are formed to cross the inner panel 12 and the outer panel 13 and are formed to be joinable to the upper wall 20 of the outer panel 13 (see FIG. 3).

As shown in FIG. 2 and FIG. 3, the first reinforcing member 26 is joined to the outer panel 13. Herein, "joining" in this embodiment refers to joining by welding.

As shown in FIG. 3, the first reinforcing member 26 is joined to the upper wall 20 of the outer panel 13 and is arranged to extend toward the vehicle width direction inner side across the joining flanges 24 and 25 (virtual line L1). In FIG. 2 and FIG. 3, reference sign 33 indicates a "joined portion" between the first reinforcing member 26 and the outer panel 13.

A bead part 34 is formed at the inclined surface 32 from an upper end part to a lower end part in the middle in the left-right direction. The bead part 34 is formed to be concave toward the outer side at each of the inclined surfaces 32 opposed to each other with the lower surface 31 interposed therebetween.

The lower surface 31 is formed to be capable of abutting against the second reinforcing member 27 when the side sill 3 is twisted (see arrow F1 shown in FIG. 3) due to an input of a side collision load and the first reinforcing member 26 rotates (see arrow F2 shown in FIG. 3). Such a lower surface 31 may also be referred to as a "first abutting surface".

The lower surface 31 is formed to gradually incline downward from the vehicle width direction inner side toward the vehicle width direction outer side in a state in which the first reinforcing member 26 is joined to the inner panel 12 and the outer panel 13 as shown in FIG. 3.

As shown in FIG. 2, the second reinforcing member 27 is a member formed of a metal plate into a box shape, and as shown in FIG. 3, a cross-sectional shape of the second reinforcing member 27 when viewed from the axial direction of the side sill 3 is formed in a rectangular shape opened on the vehicle width direction inner side and the lower side.

As shown in FIG. 2 and FIG. 3, the second reinforcing member 27 includes an upper wall 35, a front wall (not shown) and a rear wall 36, a side wall 37, and a joining part 38. The upper wall 35 is provided at an upper end face. The front wall (not shown) and the rear wall 36 are continuous with a front end part and a rear end part of the upper wall 35 and extend to a lower end part of the second reinforcing member 27. The side wall 37 is continuous to connect the upper wall 35, the front wall, and the rear wall 36 and extends downward. The joining part 38 is provided at a free end part (open end part) of the upper wall 35.

An upper surface 40 of the upper wall 35 is formed to be capable of abutting against the lower surface 31 (first abutting surface) of the first reinforcing member 26 when the side sill 3 is twisted (see arrow F1 shown in FIG. 3) due to an input of a side collision load and the first reinforcing member 26 rotates (see arrow F2 shown in FIG. 3). Such an upper surface 40 may also be referred to as a "second abutting surface".

The side wall 37 of the second reinforcing member 27 is formed to have a lower end part serving as an extending part 41. The extending part 41 is clamped and joined by the joining flange 25. More specifically, as shown in FIG. 3, the extending part 41 is clamped and joined by the joining parts 18 and 23.

By forming the second reinforcing member 27 as described above, a closed cross section is formed by the inner wall 14 and the lower wall 16 of the inner panel 12 and the upper wall 35 and the side wall 37 of the second reinforcing member 27. A space surrounded by the inner wall 14 and the lower wall 16 of the inner panel 12 and the upper wall 35 and the side wall 37 of the second reinforcing member 27 is formed as a hollow part 42.

The joining part 38 is formed to be joinable to the inner wall 14 of the inner panel 12 (see FIG. 3), and the joining part 39 is formed to be joinable to the lower wall 16 of the inner panel 12 (see FIG. 2).

As shown in FIG. 2 and FIG. 3, the second reinforcing member 27 is joined to the inner wall 14 and the lower wall 16 of the inner panel 12. Herein, "joining" in this embodiment refers to joining by welding.

Next, actions and effects obtained by this embodiment will be described with reference to FIG. 1 and FIG. 3.

According to this embodiment, since the first reinforcing member 26 in a wavy shape when viewed from the vehicle width direction is arranged on the upper side in the closed cross section of the side sill 3, and the second reinforcing member 27 is arranged below the first reinforcing member 26 in the closed cross section of the side sill 3, when the side sill 3 is twisted (see arrow F1 shown in FIG. 3) due to an input of a side collision load, the first reinforcing member 26 and the second reinforcing member 27 abut against each other, and load transmission between the bulkhead 10 and the side sill 3 becomes possible. As a result, it is possible to suppress peeling of the side sill 3 and deformation of the cross-sectional shape of the side sill 3 at the time of an input of a side collision load, and the efficiency of load transmission to the vehicle body 1 side can be improved.

Further, according to this embodiment, since the second reinforcing member 27 is arranged below the first reinforcing member 26 joined to the outer panel 13, when the side sill 3 is twisted due to a side collision, the first reinforcing member 26 and the second reinforcing member 27 abut against each other, and a moment (torsion) load inputted to the outer panel 13 can be transmitted to the vehicle body 1 side via the first reinforcing member 26 and the second reinforcing member 27. As a result, it is possible to suppress peeling of the side sill 3 and deformation of the cross-sectional shape of the side sill 3 at the time of an input of a side collision load, and the efficiency of load transmission to the vehicle body 1 side can be improved.

Further, according to this embodiment, since the second reinforcing member 27 joined to the inner panel 12 is arranged below the first reinforcing member 26 joined to the outer panel 13, when the side sill 3 is twisted due to a side collision, the first reinforcing member 26 and the second reinforcing member 27 abut against each other, and a moment (torsion) load inputted to the inner panel 12 and the outer panel 13 can be transmitted via the first reinforcing member 26 and the second reinforcing member 27 to each other and to the vehicle body 1 side. As a result, it is possible to suppress peeling of the side sill 3 and deformation of the cross-sectional shape of the side sill 3 at the time of an input of a side collision load, and the efficiency of load transmission to the vehicle body 1 side can be improved.

Further, according to this embodiment, since the reinforcing member 11 is arranged side by side with the cross member 7 in the vehicle width direction, even if the side sill 3 rotates (see arrow F1 shown in FIG. 3) due to a side collision, a load can be transmitted to the cross member 7, which has a high rigidity, via the first reinforcing member 26 and the second reinforcing member 27. As a result, it is possible to suppress peeling of the side sill 3 and deformation of the cross-sectional shape of the side sill 3 at the time of an input of a side collision load, and the efficiency of load transmission to the vehicle body 1 side can be improved.

Further, according to this embodiment, since the second reinforcing member 27 is formed in a box shape forming a closed cross section with the inner panel 12, the efficiency of load transmission between the first reinforcing member 26 and the second reinforcing member 27 is improved when the first reinforcing member 26 and the second reinforcing member 27 abut against each other, and the rigidity of the side sill 3 can be improved. As a result, it is possible to suppress peeling of the side sill 3 and deformation of the cross-sectional shape of the side sill 3 at the time of an input of a side collision load, and the efficiency of load transmission to the vehicle body 1 side can be improved.

Further, according to this embodiment, since the second reinforcing member 27 includes the extending part 41 which is clamped and joined by the joining flange 25, the joining strength between the second reinforcing member 27 and the side sill 3 and the joining strength between the inner panel 12 and the outer panel 13 are improved, and it is possible to suppress peeling of the joining parts of the joining flanges 24 and 25 and peeling between the second reinforcing member 27 and the side sill 3 when the side sill 3 rotates. As a result, it is possible to suppress peeling of the side sill 3 and deformation of the cross-sectional shape of the side sill 3 at the time of an input of a side collision load, and the efficiency of load transmission to the vehicle body 1 side can be improved.

Second Embodiment

In addition to the first embodiment, the side sill structure according to the disclosure may adopt the second embodiment below.

Hereinafter, the second embodiment will be described with reference to FIG. 1, FIG. 4, and FIG. 5. FIG. 4 is a partially see-through view of a part (where a reinforcing member is arranged) of a side sill structure according to the second embodiment of the disclosure, and is a perspective view showing a state viewed from the rear side. FIG. 5 is a cross-sectional view taken along line B-B in FIG. 4.

The arrows in the drawings respectively indicate the up-down direction, the left-right direction, and the front-rear direction (the directions of the arrows are exemplary). Further, the same constituent members as in the first embodiment will be labeled with the same reference signs, and detailed descriptions thereof will be omitted.

This embodiment describes a case where the side sill structure according to the disclosure is applied to a side sill 50 in the floor part 2 of the vehicle body 1 of the vehicle shown in FIG. 1. The side sill 50 in this embodiment shown in FIG. 4 is basically the same as the side sill 3 in the first embodiment in terms of the configuration and structure, except that a reinforcing member 51 is provided herein instead of the reinforcing member 11 (see FIG. 2 and FIG. 3) in the first embodiment.

The reinforcing member 51 in this embodiment is basically the same as the reinforcing member 11 in the first embodiment in terms of the configuration and structure, except that a second reinforcing member 52 is provided herein. The second reinforcing member 52 will be described below.

Figure 4:
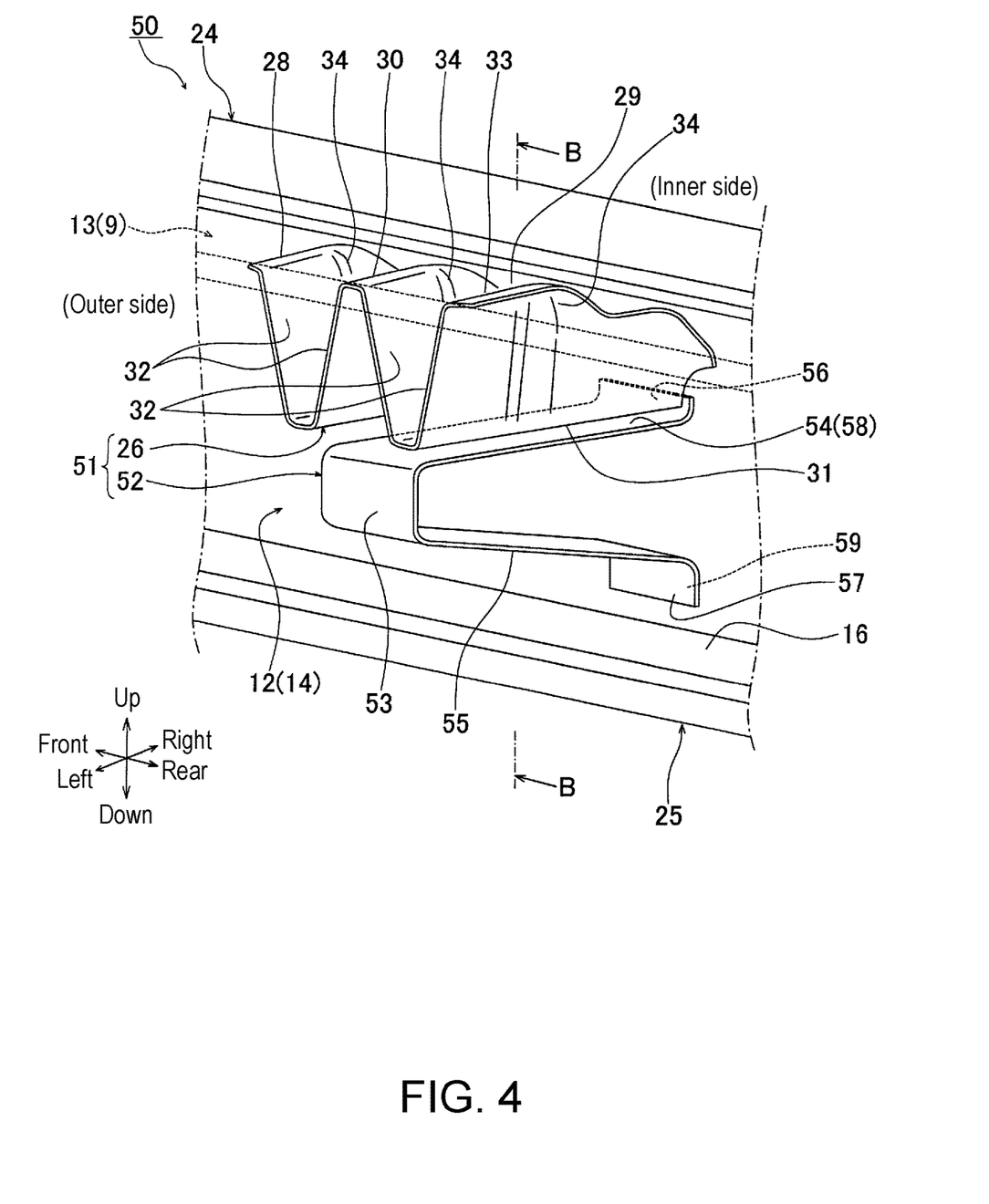
FIG. 4 is a partially see-through view of a part (where a reinforcing member is arranged) of a side sill structure according to a second embodiment of the disclosure, and is a perspective view showing a state viewed from the rear side.
Figure 5:
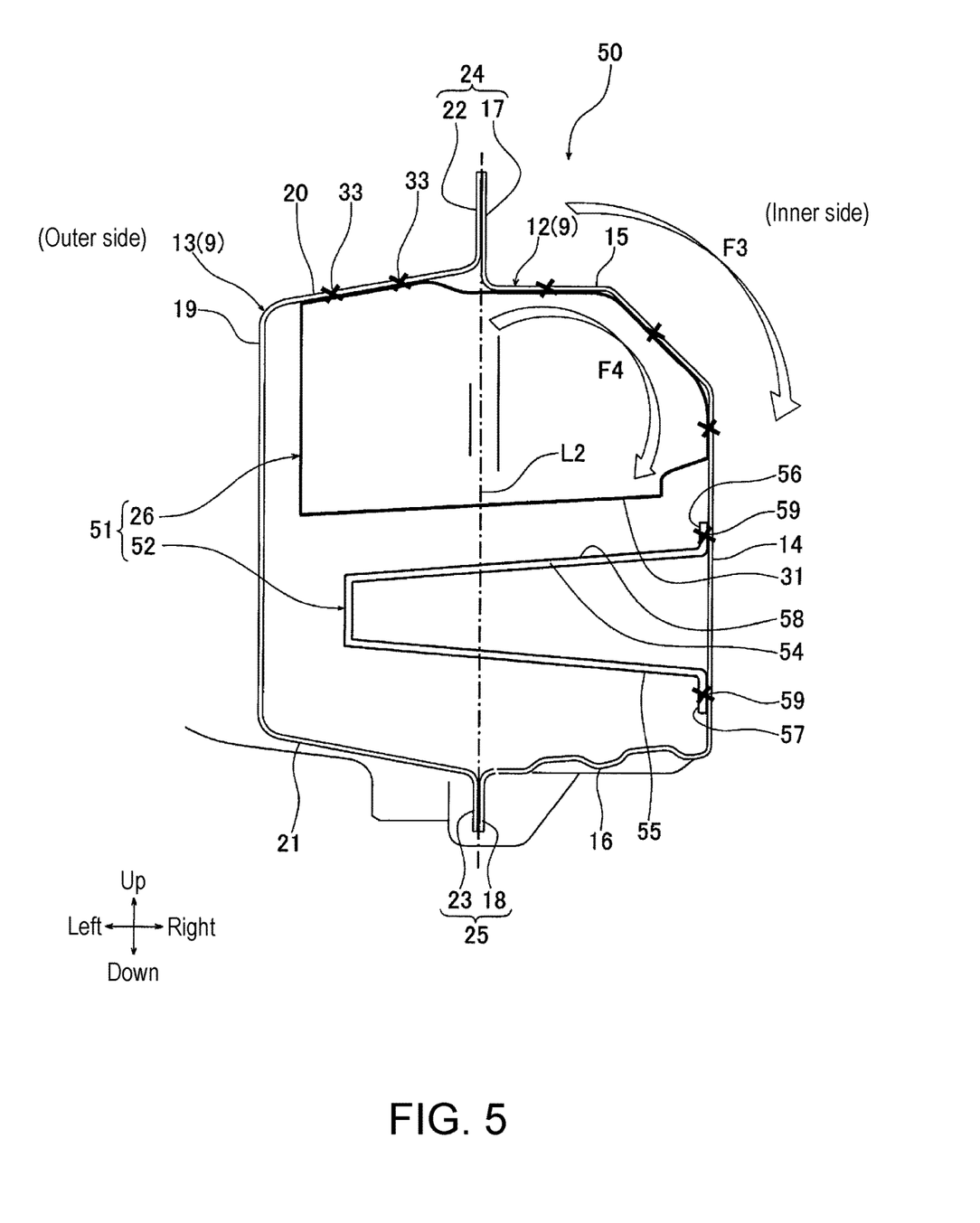
FIG. 5 is a cross-sectional view taken along line B-B in FIG. 4.

As shown in FIG. 4 and FIG. 5, the second reinforcing member 52 is a member formed by bending a metal plate into a predetermined shape, and a cross section of the second reinforcing member 52 is formed in a substantially U-shape (hat shape) opened toward the vehicle width direction inner side when viewed from the axial direction of the side sill 50. The second reinforcing member 52 is arranged side by side with the first reinforcing member 26 at a predetermined interval in the up-down direction.

The second reinforcing member 52 includes a side wall 53, an upper wall 54, a lower wall 55, and joining parts 56 and 57.

The side wall 53 is formed as a portion corresponding to a tip part of the second reinforcing member 52. The upper wall 54 is formed to have one end continuous with an upper end part of the side wall 53 and extend toward the vehicle width direction inner side. The lower wall 55 is formed to have one end continuous with a lower end part of the side wall 53 and extend toward the vehicle width direction inner side.

An upper surface 58 of the upper wall 54 is formed to be capable of abutting against the lower surface 31 (first abutting surface) of the first reinforcing member 26 when the side sill 50 is twisted (see arrow F3 shown in FIG. 5) due to an input of a side collision load and the first reinforcing member 26 rotates (see arrow F4 shown in FIG. 5). Such an upper surface 58 may also be referred to as a "second abutting surface".

The joining part 56 is formed to be continuous with another end of the upper wall 54 and extend upward. The joining part 57 is formed to be continuous with another end of the lower wall 55 and extend downward. The joining parts 56 and 57 are formed to be joinable to the inner wall 14 of the inner panel 12.

As shown in FIG. 4 and FIG. 5, the second reinforcing member 52 is joined to the inner wall 14 of the inner panel 12. Herein, "joining" in this embodiment refers to joining by welding. In FIG. 4 and FIG. 5, reference sign 59 indicates a "joined portion" between the second reinforcing member 52 and the inner wall 14 of the inner panel 12.

The second reinforcing member 52 is formed so that a width in the height direction (up-down direction) gradually narrows from the vehicle width direction inner side toward the vehicle width direction outer side. That is, the width between the upper wall 54 and the lower wall 55 is formed to gradually narrow from the vehicle width direction inner side toward the vehicle width direction outer side.

The second reinforcing member 52 is formed so that, in a state of being joined to the inner panel 12, the tip part (side wall 53) side extends more outward in the vehicle width direction than the joining flanges 24 and 25 (virtual line L2).

Next, actions and effects obtained by this embodiment will be described with reference to FIG. 1 and FIG. 5. According to this embodiment, in addition to the effects similar to those of the first embodiment, the following effects are also obtained.

According to this embodiment, since the second reinforcing member 52 is joined to the inner wall 14 of the inner panel 12 and is formed in a U-shaped cross section opened toward the vehicle width direction inner side when viewed from the axial direction of the side sill 50, the efficiency of load transmission between the first reinforcing member 26 and the second reinforcing member 52 is improved when the first reinforcing member 26 and the second reinforcing member 52 abut against other, and the rigidity of the side sill 50 can be improved. Further, since the lower part of the inner panel 12 is pressed against the vehicle interior 8 side when a side collision load is inputted to the second reinforcing member 52, it is possible to oppose to a force of the upper part of the side sill 50 collapsing toward the vehicle interior 8 side. As a result, it is possible to suppress peeling of the side sill 50 and deformation of the cross-sectional shape of the side sill 50 at the time of an input of a side collision load, and the efficiency of load transmission to the vehicle body 1 side can be improved.

Further, according to this embodiment, since the second reinforcing member 52 extends more outward in the vehicle width direction than the joining flanges 24 and 25 (virtual line L2), the efficiency of load transmission between the first reinforcing member 26 and the second reinforcing member 52 is improved when the first reinforcing member 26 and the second reinforcing member 52 abut against each other, and the rigidity of the side sill 50 can be improved. Further, since the lower part of the inner panel 12 is pressed against the vehicle interior 8 side when a side collision load is inputted to the second reinforcing member 52, it is possible to oppose to a force of the upper part of the side sill 50 collapsing toward the vehicle interior 8 side. As a result, it is possible to suppress peeling of the side sill 50 and deformation of the cross-sectional shape of the side sill 50 at the time of an input of a side collision load, and the efficiency of load transmission to the vehicle body 1 side can be improved.

In addition, the disclosure may be modified in various ways without departing from the gist of the disclosure.

What is claimed is:

1. A side sill structure for a vehicle, wherein a side sill arranged at two ends in a vehicle width direction of a floor part of a vehicle and extending in a front-rear direction of the vehicle comprises:
   an inner panel forming a vehicle width direction inner side;
   an outer panel forming a vehicle width direction outer side; and
   a reinforcing member arranged in a closed cross section formed by joining the inner panel and the outer panel, and
   the reinforcing member comprises:
   a first reinforcing member arranged on an upper side in the side sill and having a wavy shape when viewed from the vehicle width direction; and
   a second reinforcing member arranged below the first reinforcing member,
   wherein the second reinforcing member is formed in a box shape forming a closed cross section with the inner panel.

2. The side sill structure for a vehicle according to claim 1, wherein
   the side sill comprises a joining flange formed by joining the inner panel and the outer panel, and
   the first reinforcing member is joined to an upper wall of the outer panel and extends toward the vehicle width direction inner side across the joining flange.

3. The side sill structure for a vehicle according to claim 2, wherein
   the first reinforcing member and the second reinforcing member are arranged side by side with a cross member in the vehicle width direction, the cross member being provided in the floor part.

4. The side sill structure for a vehicle according to claim 1, wherein
   the second reinforcing member comprises an extending part clamped and joined by a joining flange.

5. The side sill structure for a vehicle according to claim 3, wherein
   the second reinforcing member is joined to an inner wall of the inner panel and is formed into a U-shaped cross section opened toward the vehicle width direction inner side when viewed from an axial direction of the side sill.

6. The side sill structure for a vehicle according to claim 5, wherein
   the second reinforcing member extends more outward in the vehicle width direction than the joining flange.

* * * * *